United States Patent
Izuyama

(10) Patent No.: US 6,830,182 B2
(45) Date of Patent: Dec. 14, 2004

(54) MAGNETIC CARD READER

(75) Inventor: Yasuo Izuyama, São Paulo (BR)

(73) Assignee: CIS Eletronica Industria e Comercio Ltda., Sao Paulo (BR)

( * ) Notice: Subject to any disclaimer, the term of this patent is extended or adjusted under 35 U.S.C. 154(b) by 0 days.

(21) Appl. No.: 10/361,554

(22) Filed: Feb. 11, 2003

(65) Prior Publication Data

US 2003/0192948 A1 Oct. 16, 2003

(30) Foreign Application Priority Data

Apr. 11, 2002 (JP) ........................................ 2002-109052

(51) Int. Cl.$^7$ .............................................. G06K 7/08
(52) U.S. Cl. .................................................. 235/449
(58) Field of Search ................................ 235/449, 487, 235/493, 446; 360/123, 125, 129, 130.32, 2, 32; 380/201, 255, 28; 713/200, 189

(56) References Cited

U.S. PATENT DOCUMENTS

| | | | | |
|---|---|---|---|---|
| 4,062,050 A | * | 12/1977 | Shigemori et al. | 360/130.3 |
| 4,642,716 A | * | 2/1987 | Wakabayashi et al. | 360/129 |
| 4,879,607 A | * | 11/1989 | Redemacher | 360/2 |
| 4,883,949 A | * | 11/1989 | Kokubo et al. | 235/449 |
| 5,801,856 A | * | 9/1998 | Moghadam et al. | 358/527 |
| 5,917,910 A | * | 6/1999 | Ishiguro et al. | 705/57 |
| 6,129,277 A | * | 10/2000 | Grant et al. | 235/449 |
| 6,400,824 B1 | * | 6/2002 | Mansoorian et al. | 380/269 |
| 6,434,699 B1 | * | 8/2002 | Jones et al. | 713/168 |
| 6,574,058 B1 | * | 6/2003 | Aruga et al. | 360/2 |
| 6,579,728 B2 | * | 6/2003 | Grant et al. | 438/3 |
| 6,585,156 B2 | * | 7/2003 | Takita | 235/449 |
| 2002/0134837 A1 | * | 9/2002 | Kishon | 235/449 |

* cited by examiner

Primary Examiner—Thien M. Le
Assistant Examiner—Edwyn Labaze
(74) Attorney, Agent, or Firm—Clark & Brody

(57) ABSTRACT

This invention aims to provide a magnetic head for a magnetic reader improved so that the data can be read out from the magnetic storage medium with high security, that is, without an anxiety that the data might be illegally read out and, even if the data is illegally read out, such illegally read out data can not be used by the illegal person.

Here is disclosed a magnetic head of a magnetic card reader adapted to read out data stored on a magnetic card, comprising a core with a coil for sensing of the data stored on the card as analog signals, an A/D converter chip adapted to convert the analog signals to corresponding digital signals and a microprocessor adapted to encrypt the digital signals. The A/D converter chip and the microprocessor (IC) are fixed within a housing by means of a synthetic resin.

3 Claims, 7 Drawing Sheets

PRIOR ART

MAGNETIC CARD READER

BACKGROUND OF THE INVENTION

This invention relates to a magnetic head used in a magnetic reader.

A magnetic head of a magnetic reader adapted to read out data stored on a magnetic storage medium is well known. An example of a conventional magnetic head as is used for a magnetic card reader 70 will be described hereunder in reference to FIG. 7. The magnetic card reader 70 reads data from a magnetic stripe of the magnetic card 71 through a magnetic head 72 coming in contact with a surface of the magnetic card 71 passing through a guide groove (not shown) of the magnetic card reader 70. The magnetic card reader 70 comprises the magnetic head 72, an A/D converter 74 connected to the magnetic head 72 via an interface cable 73 and a control unit 76 connected to the A/D converter 74 via an interface cable 75.

The magnetic head 72 has a core and a coil wound around the core. The control unit 76 is a computer having a CPU, a memory, a hard disc, a CD-ROM drive and a floppy disc drive. Though not shown, a display (display device), a keyboard (input device) and a printer (output device) are connected to the control unit 76 via interface cables.

As the magnetic card 71 with the magnetic stripe passes through the guide groove of the magnetic card reader 70 by the distal end (core gap) of the magnetic head 72, a magnetic flux changes around the core and thereby an induced electromotive force is generated so that an electric current flows in the coil to cancel a variation of the magnetic flux. The current flows from the coil to the A/D converter 74 via the interface cable 73 and is detected by the A/D converter as analog signals. The A/D converter 74 converts the analog signals input from the magnetic head 72 to corresponding digital signals. The digital signals are output from the A/D converter 74 to the control unit 76 via the interface cable 75. The control unit 76 amplifies the digital signals and outputs the digital signals via the display and/or the printer in the form of character data and/or print data, respectively. Furthermore, the control unit 76 stores the data in the form of digital signals in its memory.

The magnetic card reader is generally classified into the reader of manual slide type in which the magnetic card is manually moved along a guide groove and the reader of electric motor-driven insertion type in which the magnetic card inserted into a card inlet is moved by a driving belt or a driving roller.

With the magnetic card reader 70 shown in FIG. 7, if any devices are connected to the interface cables 73, 75, it is possible that the analog signals through the magnetic head 72 might be illegally read out via the cable 73 or the digital signals converted by the A/D converter 74 might be read out via the cable 75. It is also possible that the data stored in the memory might be illegally read out via the cables 73, 75. Both writing and reading data in and from the magnetic card are relatively easy in view of the method of recording on the magnetic card. Accordingly, the magnetic card would be easily duplicated using the data in the form of analog or digital signals which is illegally read out.

SUMMARY OF THE INVENTION

It is an object of this invention to provide a magnetic head for a magnetic reader improved so as to make it difficult for others to read out data illegally in the process of reading data from a magnetic storage medium and so as to encrypt the data in order to make the data unavailable to others even if the data is illegally read out.

According to this invention, there is provided a magnetic head of a magnetic reader adapted to read data from a magnetic storage medium.

The magnetic head comprises a core with a coil adapted to sense the data stored on the storage medium in the form of analog signals, an A/D converter chip electrically connected to the coil and adapted to convert the analog signals to corresponding digital signals and an IC electrically connected to the A/D converter chip and adapted to encrypt the digital signals.

This invention includes the following embodiments. The magnetic head further comprises a housing defining an outer peripheral surface of the magnetic head and containing therein the core, the A/D converter chip and the IC.

The A/D converter chip and the IC are fixed within the housing by means of a synthetic resin.

The magnetic reader includes a node terminal adapted to decrypt the digital signals having been encrypted by the IC and electrically connected to the IC of the magnetic head.

The IC is selected from a group including a microprocessor, a gate array, a field programmable gate array and a dedicated hard ware.

The magnetic storage medium is a magnetic card and the magnetic reader is a magnetic card reader.

DETAILED DESCRIPTION OF THE PREFERRED EMBODIMENTS

Details of a magnetic head used in a magnetic reader according to this invention will be more fully understood from the description of a magnetic head used in a magnetic card reader given hereunder in reference to the accompanying drawings.

Figure 1:
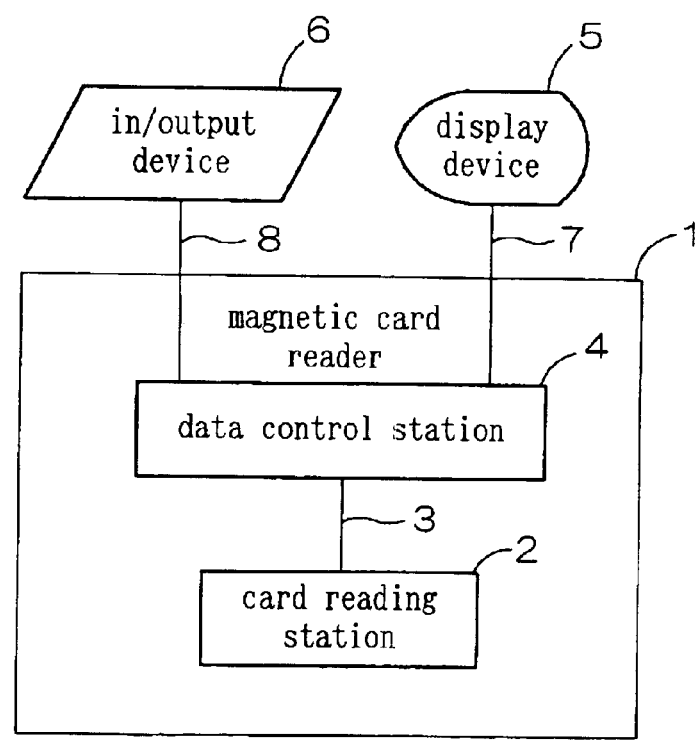
FIG. 1 is a block diagram schematically illustrating a magnetic card reader.
Figure 2:
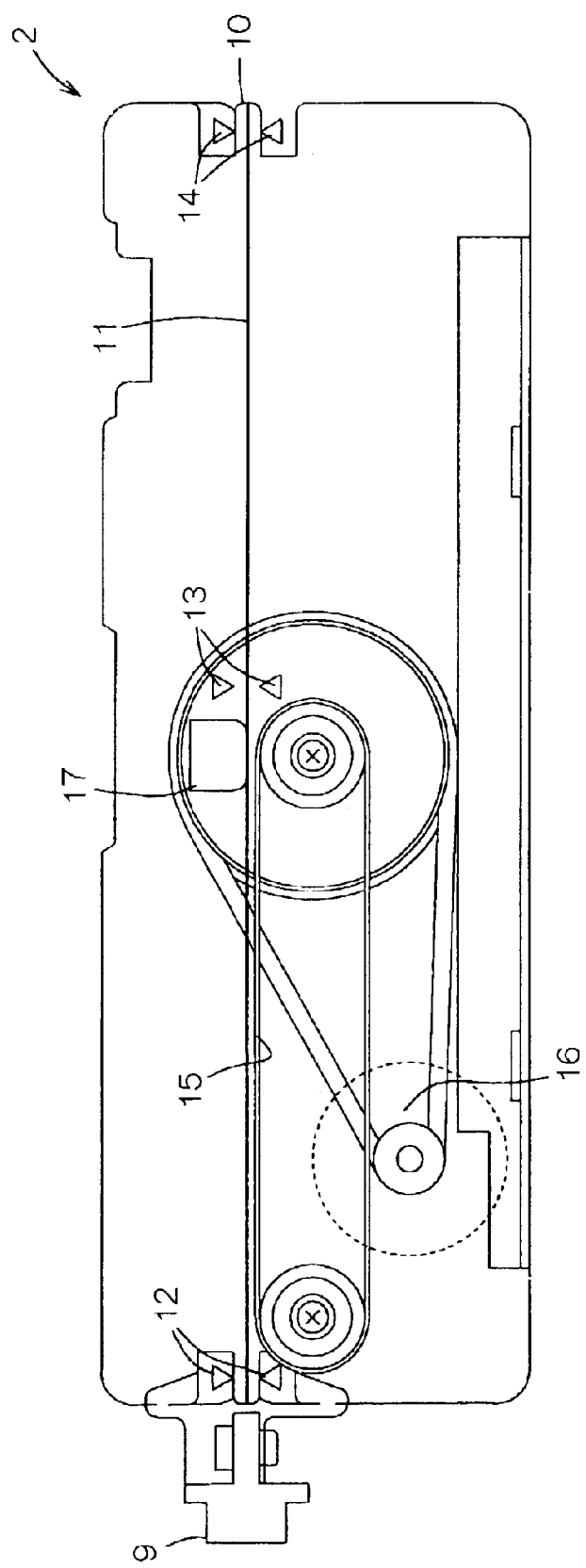
FIG. 2 is a diagram schematically illustrating an internal construction of a card reading station.
Figure 3:
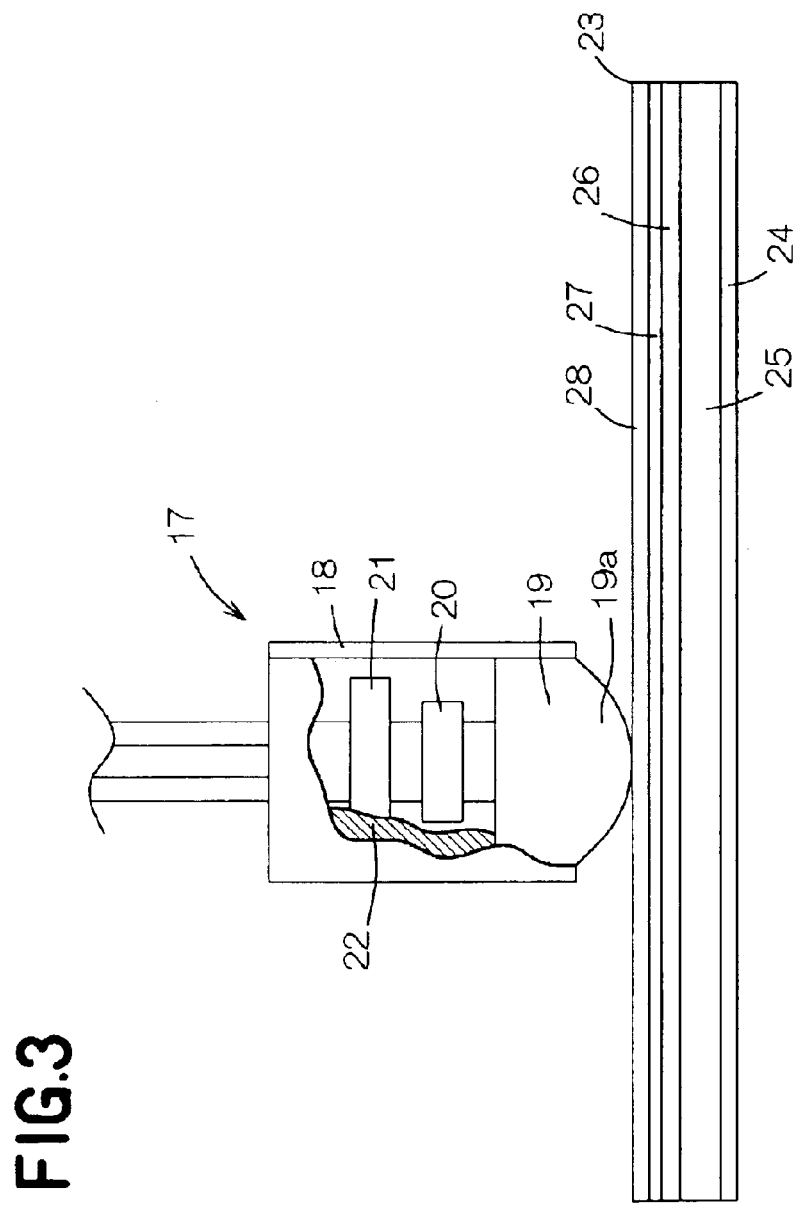
FIG. 3 is a partially cutaway perspective view showing a magnetic head incorporated in the card reading station.

FIG. 1 is a block diagram schematically illustrating a magnetic card reader 1, FIG. 2 is a diagram schematically illustrating an internal structure of a card reading station 2 and FIG. 3 is a partially cutaway perspective view showing a magnetic head 17 incorporated in the card reading station 2. In FIG. 3, a core 19 of the magnetic head 17 has its distal end 19a in contact with an upper surface of a magnetic card 23. FIG. 3 shows the interior of a housing 18 by partially cutting a synthetic resin 22 filled in the housing 18.

As will be apparent from FIG. 1, the magnetic card reader 1 comprises the card reading station 2 adapted to sense data stored on a magnetized layer 26 of the magnetic card 23 in the form of electric signals and a data control station 4 (terminal node) connected to the card reading station 2 via an interface cable 3. The data control station 4 is a computer comprising a CPU (central processing unit), a memory (auxiliary memory), a hard disc, a CD-ROM drive and a floppy disc drive. A display 5 (display device) adapted to output data in the form of character information, a keyboard 6 (input device) adapted to add and/or change data and a printer 6 (output device) adapted to output the data in the form of printed information are connected to the data control station 4 via interface cables 7, 8.

As will be seen in FIG. 2, the card reading station 2 is of motor-driven insertion type and has a card inlet 9 on its front end, a card outlet 10 on its rear end and a card guiding rail 11 extending from the card inlet 9 to the card outlet 10. The card reading station 2 is provided at its longitudinally middle region with the magnetic head 17 which will be hereinafter described more in detail. In the vicinity of the inlet 9, the outlet 10 and the magnetic head 17, there are provided photo-sensors 12, 13, 14, respectively, for position-detection of the magnetic card 23 moving along the guiding rail 11. Upon insertion of the magnetic card 23 into the inlet 9 of the card reading station 2, the magnetic card 23 is automatically moved along the guiding rail 11 and is ejected from the outlet 10.

In the card reading station 2, the distal end 19a of the core 19 (See FIG. 3) constituting the magnetic head 17 is opposed to the guiding rail 11. The card 23 is moved along the guiding rail 11 on a belt 15 provided within the card reading station 2. The belt 15 is driven by motor 16 rotates.

As will be seen in FIG. 3, the magnetic head 17 comprises the housing 18 covering an outer peripheral surface thereof, the core 19 provided with coil (not shown), an A/D converter chip 20 electrically connected to the coil and a microprocessor 21 (IC) electrically connected to the A/D converter chip 20. In the magnetic head 17, the core 19, the A/D converter chip 20 and the microprocessor 21 are contained within the housing 18. In the magnetic head 17, the distal end 19a of the core 19 is exposed outward from the lower end of the housing 18. Though not shown, the microprocessor 21 includes an arithmetic unit, a control unit and a cache memory.

The A/D converter chip 20 and the microprocessor 21 are entirely fixed to the inside of the housing 18 by means of synthetic resin 22 filled in the housing 18. As the synthetic resin 22, it is preferred to use a suitable thermosetting synthetic resin. It is also possible to use a thermoplastic synthetic resin in the place of the thermosetting synthetic resin.

The magnetic card 23 is composed of a color print layer 24, a base layer 25, a magnetized layer 26, a shield layer 27 and a print layer 28 which are overlaid in this order from the lower surface of the magnetic card 23. In the magnetic card 23, the magnetized layer 26 is made from a ferromagnetic material and the base layer 25 is made from a polyethylene terephthalate.

When the magnetic card 23 is inserted through the card inlet 9 into the card reading station 2, the photo-sensor 12 detects the magnetic card 23 and outputs a card insertion signal to the data control station 4. Upon receipt of the card insertion signal, the data control station 4 outputs a command to the microprocessor 21 of the magnetic head 17 for reading of the data stored on this card 23.

When the magnetized layer 26 of the magnetic card 23 passes by the distal end 19a of the core 19 (i.e., core gap) constituting the magnetic head 17, a magnetic flux changes around the core 19 whereupon an induced electromotive force is generated and an electric current flows in the coil. A value of the electric current flowing in the coil is dependent on the variation of the magnetic flux and input to the A/D converter chip 20 in the form of analog signals. The A/D converter tip 20 converts the analog signals to the corresponding digital signals. The digital signals are then input to the microprocessor 21 connected to the A/D converter chip 20. The microprocessor 21 encrypts the digital signals. The encrypted digital signals are then output from the microprocessor 21 to the data control station 4.

If the photo-sensors 13, 14 detect the magnetic card 23 passing by the magnetic head 17 and then being ejected from the card outlet 10, the photo-sensors 13, 14 respectively output card passage signals to the data control station 4. In response to the card passage signals, the data control station 4 commands the microprocessor 21 to stop reading data.

The data control station 4 has an amplifier (not shown) for amplification of the digital signals and decrypts the digital signals having been amplified by the amplifier. The data control station 4 may output the decrypted digital signals to the display 5 or the printer 6. The data control station 4 stores the encrypted or decrypted digital signals in the memory. The data control station 4 includes a cache memory so that the encrypted or decrypted digital signals may be stored also in the cache memory.

Figure 4:
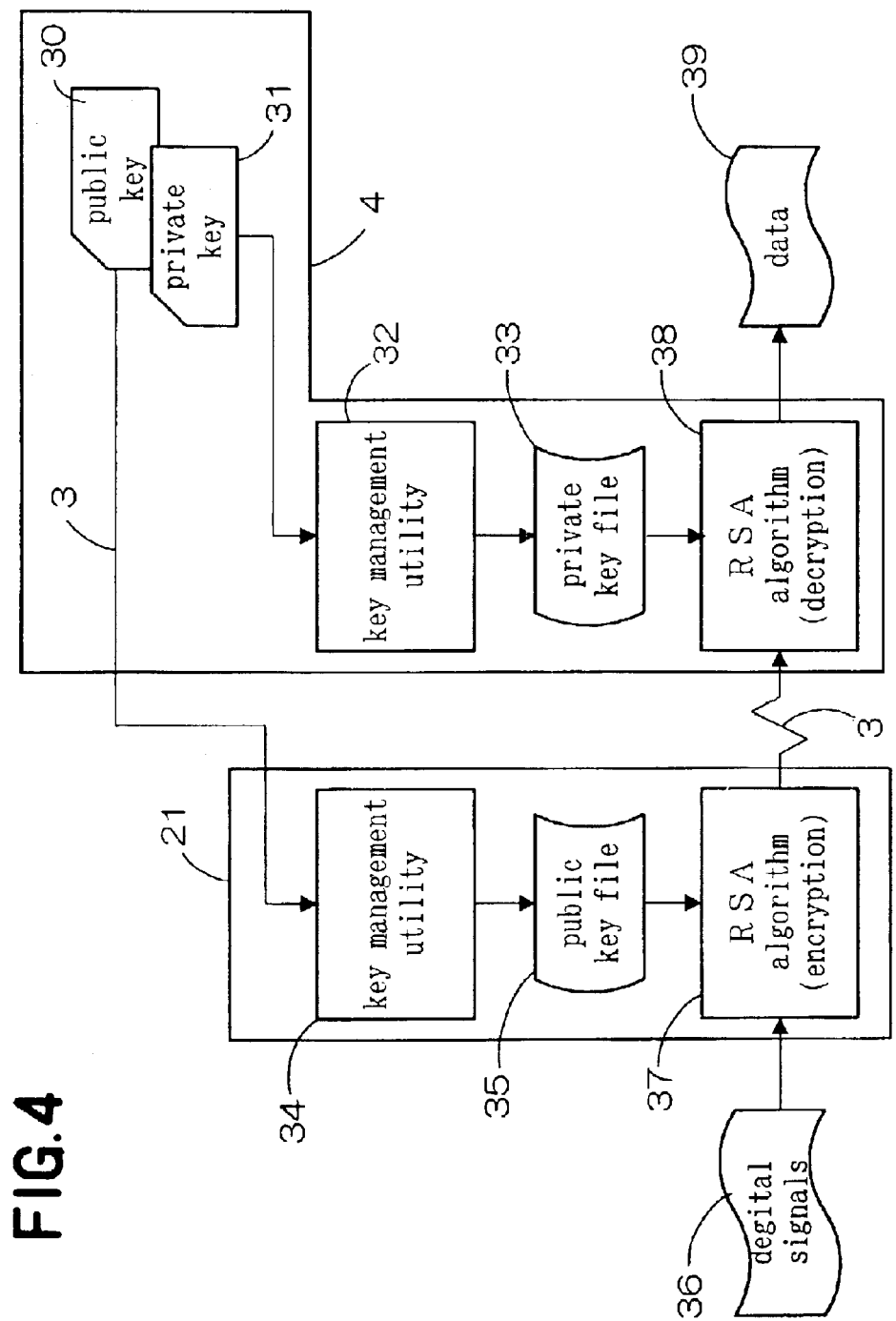
FIG. 4 is a flow chart illustrating a sequence of encryption and decryption effectuated between a microprocessor and a data control station.

FIG. 4 is a flow chart illustrating a sequence of encryption and decryption effectuated between the data control station 4 and the microprocessor 21. In the magnetic card reader 1 according to this invention, the public key cryptosystem (RSA pubic key cryptosystem) is adopted to encrypt and decrypt the data between the data control station 4 and the microprocessor 21.

Upon receipt of the card insertion signal from the photo-sensor 12, the data control station 4 generates a public key 30 for the encryption of the data stored on the magnetic card 23 and a private key 31 for the decryption of the data having been encrypted in this manner.

The private key 31 is input to a key management utility 32 of the CPU, in which the private key 31 is address-allocated in a predetermined manner. The private key 31 is then input from the key management utility 32 to a private key file 33 of the memory and stored therein. The public key 30, on the other hand, is input from the data control station 4 to a key management utility 34 of the microprocessor 21 via the interface cable 3 and is address-allocated in a predetermined manner in the key management utility 34. The public key 30 is input from the key management utility 34 to the cache memory of the microprocessor 21 and stored in a public key file 35 of the cache memory.

Upon receipt of digital signals 36 from the A/D converter chip 20, the microprocessor 21 takes the public key 30 out from the public key file 35 and makes up a RSA algorithm 37 using the public key 30. The microprocessor 21 encrypts the digital signals 36 in accordance with the RSA algorithm 37 and outputs the encrypted digital signals 36 to the data control station 4 via the interface cable 3. Upon receipt of the encrypted digital signals 36 from the microprocessor 21, the data control station 4 takes the private key 31 out from the private key file 33 of the memory and makes up a RSA algorithm 38 using the private key 31. The private key 31 taken out from the private key file 33 corresponds to the public key 30 which has been used by the microprocessor 21 to encrypt the digital signals 36. The data control station 4 decrypts the encrypted digital signals 36 in accordance with the RSA algorithm 38 and thereby obtains data 39 stored on the magnetic card 23.

In the magnetic card reader 1 according to this invention, both the A/D converter chip 20 and the microprocessor 21 are contained within the housing 18 and therefore it is impossible to attach a device adapted for illegal reading of the data in the form of the analog or digital signals to the magnetic card reader 1 without disassembly of the magnetic head 17. Consequently, it is difficult to read out the data illegally. In the magnetic card reader 1, the magnetic head 17 includes the microprocessor 21 adapted to encrypt the data stored on the magnetic card 23. Consequently, even if the data stored on the magnetic card 23 is illegally read out, the data can not be used without decrypting the encrypted data. It is thus practically impossible to duplicate the magnetic card 23.

Figure 5:
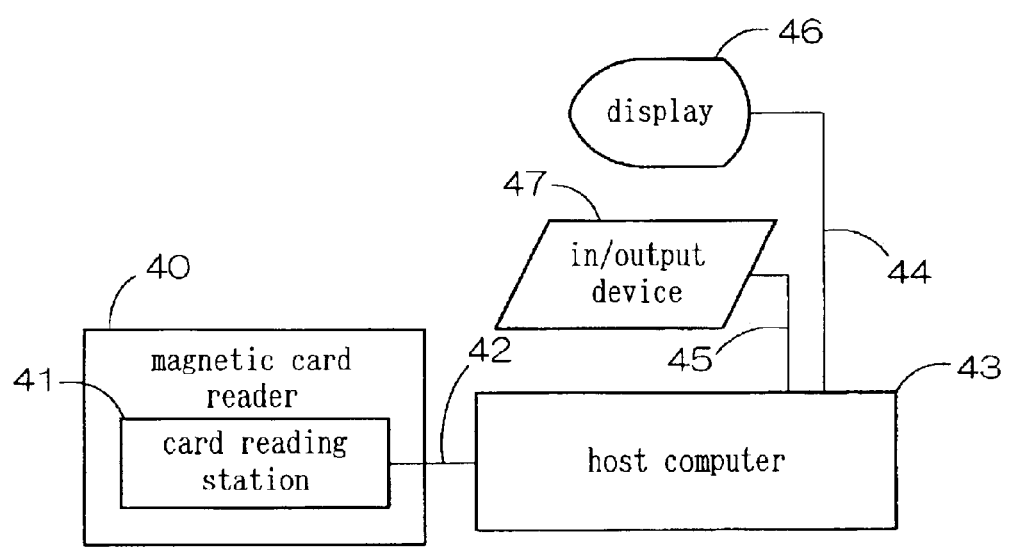
FIG. 5 is a block diagram schematically illustrating an alternative embodiment of the magnetic card reader.
Figure 6:
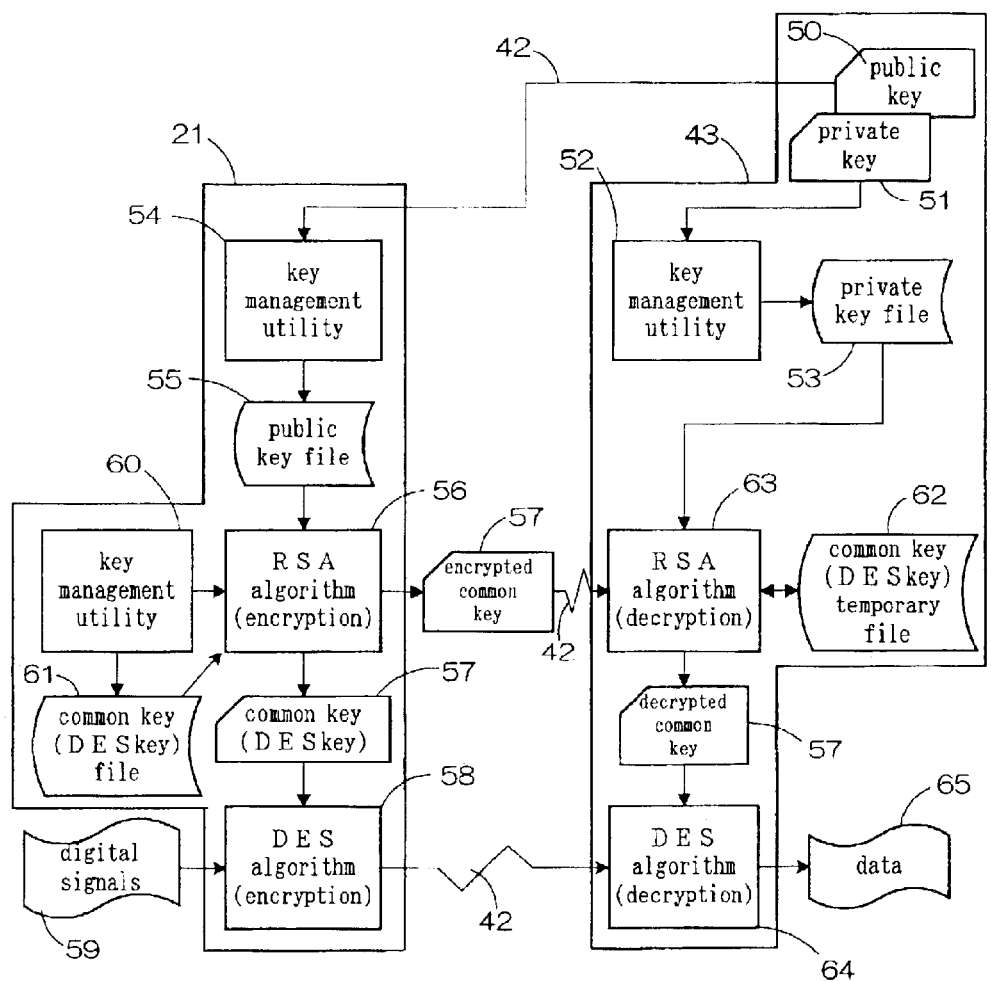
FIG. 6 is a flow chart illustrating a sequence of encryption and decryption effectuated between the microprocessor and a host computer.
Figure 7:
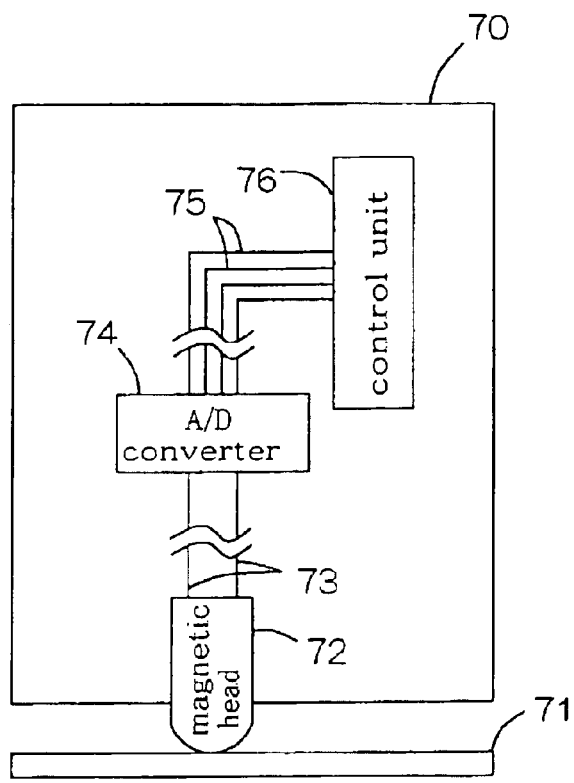
FIG. 7 is a diagram schematically illustrating a well-known magnetic head used in the magnetic card reader.

FIG. 5 is a block diagram schematically illustrating an alternative embodiment 40 of the magnetic card reader and FIG. 6 is a flow chart illustrating a sequence of encryption and decryption effectuated between the microprocessor 21 and a host computer 43.

The magnetic card reader 40 includes a card reading station 41. The card reading station 41 contains therein the same magnetic head 17 as that shown in FIG. 3 adapted to convert the data stored on the magnetic card 23 to the corresponding digital signals and to encrypt the digital signals. The card reading station 41 of the magnetic card reader 40 has the same structure as that shown in FIG. 2 and detailed description thereof will be eliminated here. The magnetic card reader 40 is externally connected to the host computer 43 (node terminal) via an interface cable 42.

The magnetic head 17 mounted on the card reading station 41 comprises the housing 18, the core 19 with the coil, the A/D converter chip 20 and the microprocessor 21 (MPU). In the magnetic head 17, the core 19 and the A/D converter chip 20 are contained within the housing 18 wherein the A/D converter chip 20 and the microprocessor 21 are entirely fixed within the housing 18 by means of the synthetic resin 22 (See FIG. 3).

The host computer 43 is a computer having a CPU, a memory, a hard disc, a CD-ROM drive and a floppy disc drive. A display 46 (display device), a keyboard 47 (input device) and a printer 47 (output device) are connected to the host computer 43 via interface cables 44, 45.

In the card reading station 41, if the photo-sensor 12 detects the magnetic card 23 being inserted into the card reading station 41 through the card inlet 9, the photo-sensor 12 outputs card insertion signals to the host computer 43. Upon receipt of the card insertion signals, the host computer 43 commands the microprocessor 21 of the magnetic head 17 to read the data stored on the card 23.

If the photo-sensors 13, 14 detect the magnetic card 23 passing by the magnetic head 17 and being ejected from the card outlet, the photo-sensors 13, 14 respectively output card passage signals to the host computer 43. In response to the card passage signals, the host computer 43 commands the microprocessor 21 to stop reading the data.

This magnetic card reader 40 adopts MIX cryptosystem which is a combination of the public key cryptosystem (RSA cryptosystem) and a common key cryptosystem (DES cryptosystem) to encrypt and decrypt the data between the microprocessor 21 and the host computer 43.

The MIX cryptosystem is a encryption system making good use of advantages offered by the RSA cryptosystem and the DES cryptosystem, respectively. More specifically, a data processing rate based on the DES algorithm is as fast as approximately $\frac{1}{100}$ of the data processing rate based on the RSA algorithm, on the plus side, and it is difficult for the DES cryptosystem to distribute keys in security and the number of keys to be managed is large, on the minus hand. The RSA cryptosystem is not only advantageously free from delivery of the private keys but also the number of keys to be managed is far less than the number of keys to be managed by the DES cryptosystem. Thus the MIX cryptosystem uses the advantage of the DES cryptosystem makes good use of the high data processing rate provided by the DES cryptosystem and of the facile key management provided by the RSA cryptosystem. According to the MIX cryptosystem, the microprocessor 21 decrypts the data on the basis of a DES algorithm 58 and decrypts a common key 57 (DES key) used to make up another DES algorithm 64 on the basis of a RSA algorithm 56.

Upon receipt of the card insertion signals from the photo-sensor 12 (See FIG. 2), the host computer 43 generates a public key 50 used for the RSA algorithm and a private key 51 used to decrypt an encrypted common key 57, as illustrated in FIG. 6. The private key 51 is input to a key management utility 52 of the CPU and address-allocated by the key management utility 52 in a predetermined manner. The private key 51 is input from the key management utility 52 to a private key file 53 of the memory and stored therein. The public key 50 is input from the host computer 43 to a key management utility 54 of the microprocessor 21 via the interface cable 42 and address-allocated by the key management utility 54. The public key 50 is input from the key management utility 54 to a public key file 55 of the cache memory and stored therein.

Upon receipt of digital signals 59 from the A/D converter chip 20, the microprocessor 21 takes the public key 50 out from the public key file 55 and makes up the RSA algorithm 56 using the public key 50. The microprocessor 21 generates the common key 57 (DES key) used for the DES algorithm 58 and then encrypts the common key 57 in accordance with the RSA algorithm 56. The microprocessor 21 makes up the DES algorithm 58 using the common key 57 and encrypts digital signals 59 in accordance with the DES algorithm 58. The common key 57 is input to a key management utility 60 and address-allocated by the key management utility 60 in a predetermined manner. The common key 57 is input from the key management utility 60 to a common key file 61 of the cache memory of the microprocessor 21 and stored therein. The microprocessor 21 outputs the encrypted common key 57 together with the encrypted digital signals 59 to the host computer 43 via the interface cable 42.

Upon receipt of the encrypted common key 57 and the encrypted digital signals 59 from the microprocessor 21, the host computer 43 address-allocates the encrypted common key 57, then stores the common key 57 in a temporary file 62 of the memory, takes the private key 51 out from the private key file 53 of the memory and makes up a RSA algorithm 38 using this private key 51. The host computer 43 decrypts the encrypted common key 57 in accordance with the RSA algorithm 63. The host computer 43 makes up a DES algorithm 64 using the decrypted common key 57. The host computer 43 decrypts the encrypted digital signals 59 in accordance with the DES algorithm 64 and thereby obtains data 65 stored on the magnetic card 23.

The private key 51 taken out from the private key file 53 corresponds to the public key 50 having been used by the microprocessor 21 to encrypt the common key 57, on one hand, and corresponds to the common key 57 having been used by the microprocessor 21 to encrypt the digital signals 59.

The host computer 43 outputs the decrypted digital signals 59 in the form of character data to the display 46 and outputs the decrypted digital signals 59 in the form of print data to the printer 47. The host computer 43 stores the encrypted digital signals 59 as well as the decrypted digital signals 59 in the memory.

With this magnetic card reader 40, any device adapted for illegal reading out of the data in the form of analog or digital signals can not be attached thereto unless the magnetic head 17 is disassembled. In the case of this magnetic card reader 40, even if the data stored on the magnetic card 23 is illegally read out, the data can not be immediately used since the data has been encrypted by the microprocessor 21 of the magnetic head 17.

The public key cryptosystem is not limited to the RSA cryptosystem and it is possible to adopt any one of EPOC cryptosystem, Rabin cryptosystem, Diffie-Hellman ElGamal cryptosystem, and Elliptic Curve Diffie-Hellman Elliptic Curve ElGamal cryptosystem. It is also possible to adopt the common key cryptosystem alone. In this case, the common key cryptosystem is not limited to the DES cryptosystem and it is possible to any one of FEAL cryptosystem, IDEA cryptosystem, MISTY cryptosystem, MULTI cryptosystem and RC2/4/5 cryptosystem.

The magnetic head may include, in addition to a microprocessor, a gate array, a field programmable gate array or a dedicated hard ware.

The card reading station is not limited to that of the electric motor-driven insertion type but may be of the manual slide type. The interface cable may be selected from a group including a RS-232C cable, a RS-422A cable and a RS-423A cable.

The magnetic head according to this invention is applicable also to a magnetic ink character reader used to read a portfolio coated with a magnetic ink.

The magnetic head according to this invention is able to encrypt the data read out from the magnetic storage medium so that, even if the encrypted data is illegally read out, the encrypted data can not be used unless the encrypted data are decrypted. In this way, it is reliably prevented to duplicate the magnetic storage medium.

With the embodiment of the magnetic head containing the core, the A/D converter chip and the microprocessor within the housing, it is impossible to attach any device adapted for illegal reading out of the data either before or after A/D conversion unless the magnetic head itself is disassembled. In view of this feature also, illegal reading out of the data is substantially impossible.

With the embodiment of the magnetic head having the A/D converter chip and the microprocessor fixed within the housing by means of synthetic resin, the magnetic head can be disassembled first after the synthetic resin has been removed. However, removal of the synthetic resin inevitably results in destruction of the A/D converter chip and the microprocessor. This feature further reliably prevent the intention to attach any device adapted for illegal reading out of the data to the A/D converter chip and the microprocessor.

What is claimed is:

1. A magnetic card reader having a magnetic head adapted to read predetermined data from a magnetic card using a magnetic material to store said predetermined data, wherein:

said magnetic head comprises a core with a coil adapted to sense said data stored on said magnetic card reader as analog signals, and an A/D converter chip electrically connected to said coil and adapted to convert said analog signals to corresponding digital signals and an IC electrically connected to said A/D converter chip, said core, said A/D converter chip and said IC are contained in a housing defining an outer peripheral surface of said magnetic head said A/D converter chip and said IC being fixed within said housing by means of a synthetic resin filled in said housing, said magnetic reader including a node terminal electrically connected to said IC said IC and said node terminal encrypting said digital signals in accordance with a cryptosystem between said IC and said node terminal, and said node terminals decrypts said digital signals having been encrypted in accordance with said cryptosystem.

2. The magnetic head according to claim 1, wherein said IC is selected from a group including a microprocessor, a gate array, a field programmable gate array and a dedicated hard ware.

3. The magnetic card reader according to claim 1, wherein said node terminal is capable of storing said digital signals having been encrypted and encrypted, respectively.

\* \* \* \* \*